Feb. 23, 1965  W. T. MORIN, JR  3,170,860
CONDITION RESPONSIVE DEVICES
Filed Jan. 22, 1962  2 Sheets-Sheet 1

INVENTOR.
BY *WILLIAM T. MORIN*

*ATTORNEY*

INVENTOR.
WILLIAM T. MORIN
BY
ATTORNEY

United States Patent Office 3,170,860
Patented Feb. 23, 1965

3,170,860
CONDITION RESPONSIVE DEVICES
William T. Morin, Jr., Minneapolis, Minn., assignor to Honeywell Inc., a corporation of Delaware
Filed Jan. 22, 1962, Ser. No. 167,734
6 Claims. (Cl. 204—195)

This invention is directed to a device for indicating the time-temperature history of an environment to which the device or an associated article is exposed. More particularly, it is directed to a device which provides a visual indication of an integrated time-temperature history of an article in an environment to which it is exposed.

The present invention has resulted from a growing need in the frozen foods industry and elsewhere for devices which can simply and acurately monitor the time-temperature experience of various products to allow a convenient and inexpensive indication of past storage conditions as a basis for indicating quality loss or the like.

It has been found that many substances deteriorate at varying rates dependent on the temperature. For example, studies published in "Food Technology," beginning at volume XI, No. 1, 1957, entitled "The Time Temperature Tolerance of Frozen Foods" have shown that a frozen food deteriorates even while in the frozen state, the rate being dependent on the temperature. These studies have shown that frozen foods such as peaches, raspberries and fried chicken will deteriorate in quality in line with the curves as illustrated in FIGURE 1. In the figure, the lines represent a specific state of deterioration with the time necessary to reach this state plotted against various storage temperatures. As can be seen, the rate of deterioration is quite rapid when in the non-frozen state, but is also sensible at temperatures below freezing. Accumulative time-temperature history is necessary to evaluate the quality of the products. The present invention fulfills this need by providing a device which operates to indicate the integrated time-temperature experience of an article in any temperature and time range desired with a visual indication thereof.

The present invention will be best understood from a study of the following examples and drawings wherein.

Figure 2:
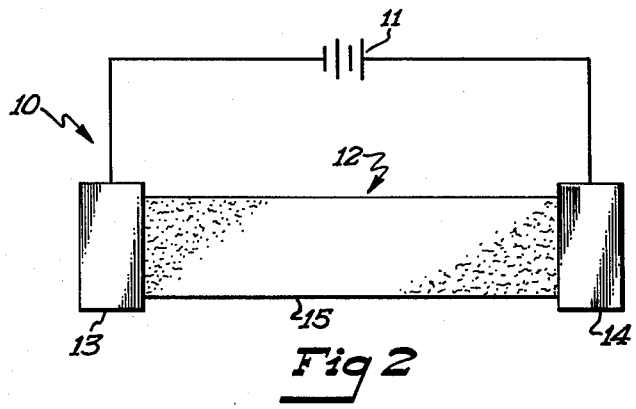
FIGURE 2 is a schematic diagram of a device in accordance with the present invention.

Referring now to FIGURE 2, it is seen that 10 generally designates a schematic representation of a device in accordance with the present invention. The device is divided into two major parts: An electromotive source 11, such as a battery or the like, and an electrolytic cell generally designated as 12. 12 is composed essentially of two metal electrodes 13 and 14 such as copper. 15 represents an absorbent matrix which may be paper, fiber, gelatine, porous ceramic, or other material serving as a carrier for the electrolyte. The matrix material is saturated with a suitable electrolyte such as KCl, $H_2O$ and an indicator substance such as Brilliant Yellow.

Operation of the device is sequentially dependent on the E.M.F. source. Upon the passage of current through the electrolytic cell, an electrolytic action takes place. In the example discussed above, hydroxyl ions are formed at the cathode 13 accompanied by the formation of hydrogen. In this example, copper ions are formed at anode 14. Of course, the ions and/or gas formed at either electrode is dependent upon the combination of electrolyte and electrode materials chosen. The increasing concentration of the hydroxyl ions is accompanied by their diffusion across the matrix towards anode 14, altering the color of the indicator substance (which is pH sensitive) and thus providing a visual indication of the extent of migration or diffusion of the hydroxyl ion.

The rate of migration of the ions is believed to be dependent on several factors:

(1) Current flow through the electrolytic cell.
(2) Temperature dependence of the E.M.F. source.
(3) Concentration gradient of the ions produced at the electrode.
(4) The field gradient across the electrolytic cell.

Figure 1:
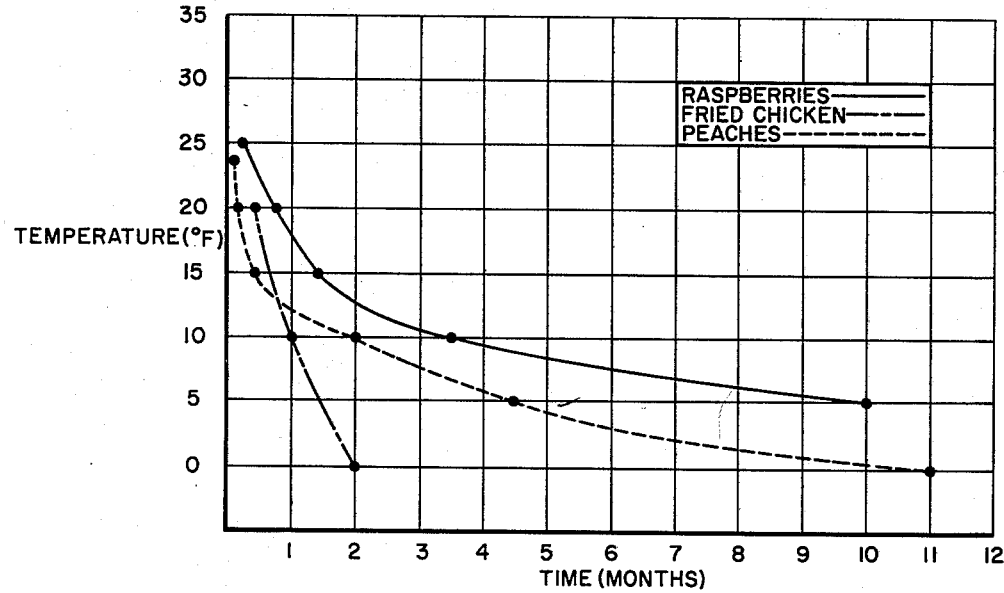
FIGURE 1 is a plot of time versus temperature for deterioration of peaches, raspberries and fried chicken to a specific quality level.
Figure 3:
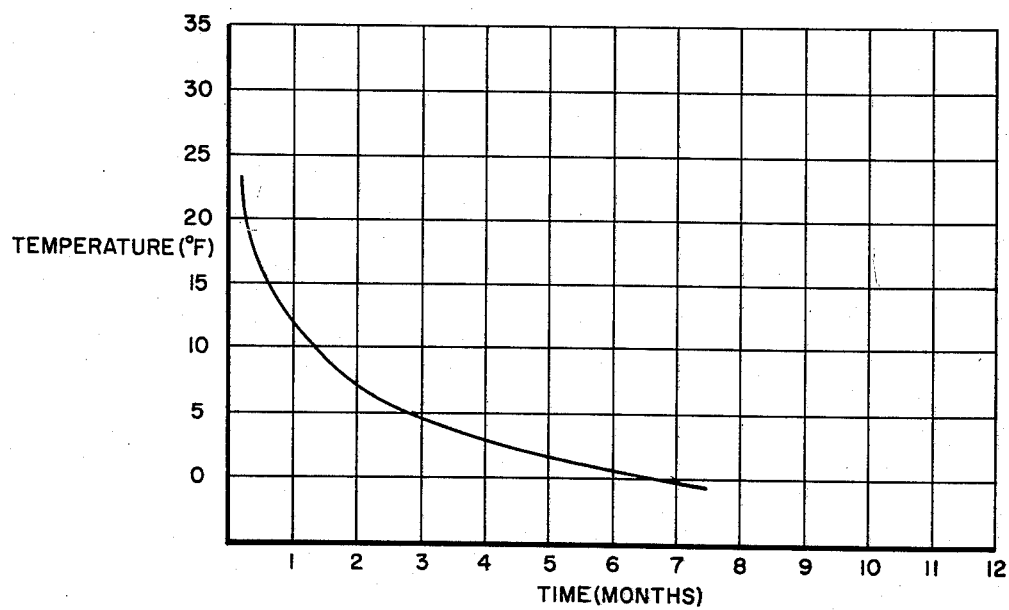
FIGURE 3 is a plot of the extent of migration of the visual boundary as a function of time and temperature in a device of the invention.

The rate of migration of the hydroxyl ion for one example of the above system has been found to be that shown in FIGURE 3. The slope of the line represents a given rate of migration. As can be seen, the time requirement for migration through a given distance is relatively short at temperatures above freezing and considerably longer at temperatures below freezing. The general shape of the curve closely approximates that of frozen foods and may be altered by variation of the various elements of the device to provide any desired response curve, including temperature ranges entirely above or below freezing.

Figure 4:
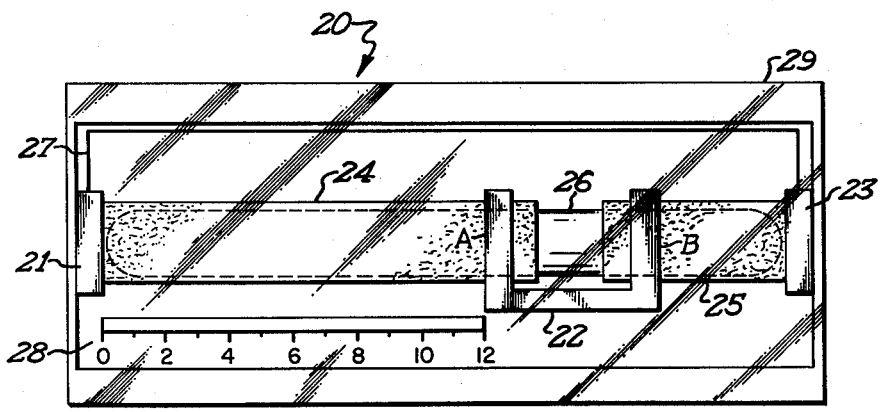
FIGURE 4 is a plan view of a preferred embodiment of a device in accordance with the present invention.
Figure 5:
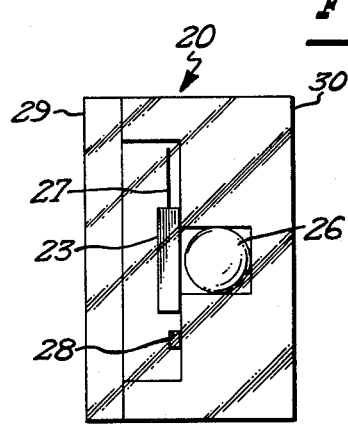
FIGURE 5 is an end view of the device of FIGURE 4 showing one modification for positioning the various elements.

Referring now to FIGURES 4 and 5, 20 generally designates a preferred embodiment of the device in accordance with the present invention. 21, 22, and 23 represent copper, copper, and cadmium electrodes respectively which are in contact with the absorbent matrix 24 and 25 (shown in two segments). Adjacent the absorbent matrix is a glass vial 26 which contains a solution of a suitable electrolyte such as 5% by weight of KCl in $H_2O$, and an indicator substance such as Brilliant Yellow. Electrodes 21 and 23 are connected by external member 27 to complete the electrical circuit of the device. The distance the ions have migrated can be measured with reference to the scale 28. The entire system is enclosed in a plastic case, the cover of which 29 is a clear plastic, e.g., polystyrene, with the container portion 30 being of opaque plastic, e.g., a modified polystyrene. Both types of plastic are commercially available.

Until the electrolyte contained in vial 26 is released onto the absorbent members 24, 25 and the metal contacts 21, 22 and 23, no reaction can occur. The device may be activated just prior to placing in contact with the article whose time-temperature history is desired, or it may be activated after placing in contact.

The preferred manner of activating the device of the invention is to mechanically fracture the vial. The liquid entrained in vial 26 is released onto the absorbent substance and time-temperature integration begins. Of course, the device should be quickly brought to the desirable storage temperature of the article whose time-temperature history is to be sensed. The indicator substance can be included within the electrolyte or may be impregnated into the absorbent substance 24 and 25.

During the subsequent discussion, it should be recognized that it is generally desirable to have the integration portion of the device operate in the solid state. That is, the electrolyte should be solid. But various modifications of the invention can be utilized in which the E.M.F. portion of the device is solid or liquid and the integrator portion of the device is solid or liquid or any combination thereof.

As stated above, the present invention consists essentially of a source of E.M.F. and an electrolytic cell. This embodiment of the present invention utilizes a unique arrangement of absorbent medium members and metal electrodes to form a galvanic cell and an electrolytic cell which is driven thereby to produce the desired indication of integrated time-temperature.

In operation, the device of FIGURE 4 works as follows. As is well known, two dissimilar metals contacting a common electrolyte and externally connected by means of a wire or the like, form a galvanic cell which produces an E.M.F. In the FIGURE 4, the copper electrode 22 and cadmium electrode 23 taken in connection with the absorbent material and electrolyte thereon form a galvanic cell with the remaining portion of the device operating as the external circuit thereof. The galvanic cell furnishes the E.M.F. required to operate the electrolytic cell portion of the device which is formed by the other end of electrode 22, copper electrode 21, the absorbent material 24 and electrolyte thereon.

Upon activation, cadmium electrode 23 enters into solution as cadmium ions giving off two electrons which are conducted through wire 27 to copper electrode 21. At 21 electrolysis begins through the formation of hydroxyl ions according to the equation.

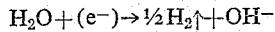

At face A of copper electrode 22, the electrolytic action is completed by the oxidation of the copper according to the equation.

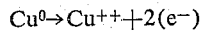

The electrons formed in this manner are conducted to face B where the galvanic action of the device is completed by a reaction between the electrolyte on the absorbent member 25 and face B.

The hydroxyl ions formed at electrode 21 migrate across the absorbent matrix 24 altering the color of the indicating substance thus providing the visual indication of the time-temperature history of the device.

Of course, the migrating metal ion formed at face A of electrode 22 could also be utilized as an indicator depending on the metal electrode chosen for the electrolytic system. A suitable indicator can be provided, although in the instance of copper electrodes, the copper ions have sufficient color to provide visual indication of the extent of their movement.

Other methods of varying the indication will readily suggest themselves to one skilled in the art. For example, many variations can be produced in such a device by a suitable choice of electrodes, electrolytes, or combinations thereof including the use of different electrolytes in the galvanic cell and the electrolytic cell. Different electrolytes in each portion of the device are effective in several ways in regard to the temperature dependent rate of migration.

I claim as my invention:

1. A device of the character described comprising in combination: galvanic cell means for producing an electric output the magnitude of which is temperature dependent; an absorbent matrix medium; a pair of spaced electrodes arranged in contact with said medium; a rupturable vial disposed adjacent said medium and containing an electrolyte composition, which composition upon rupture of said vial is capable of impregnating said medium; and means electrically connecting said galvanic cell means and said electrodes for applying said output thereto, passage of said output through said electrodes generating reaction products in said electrolyte at said electrodes at a rate proportional to the temperature of said device with at least one of said reaction products migrating at a time-temperature dependent rate along said medium to produce a visible change therein.

2. A device of the character described comprising in combination: a galvanic cell for producing an electric output the magnitude of which is temperature dependent, said galvanic cell including a first absorbent matrix medium for containing an electrolyte and having a first pair of spaced electrodes arranged in contact with said first medium, said first pair of electrodes consisting of dissimilar metals and reacting with said electrolyte to produce said output; an electrolytic cell including a second absorbent matrix medium for containing an electrolyte and having a second pair of spaced electrodes arranged in contact with said second medium; and means electrically connecting said first and second pairs of electrodes for applying said output of said galvanic cell to said electrolytic cell, passage of said output through said second pair of electrodes generating reaction products in said electrolyte contained in said second medium at said second pair of electrodes with at least one of said reaction products migrating at a time-temperature dependent rate along said second medium to produce a visible change therein.

3. A device of the character described comprising in combination: a galvanic cell for producing an electric output the magnitude of which is temperature dependent, said galvanic cell including a first absorbent matrix medium for containing a first electrolyte composition and a first pair of spaced electrodes arranged in contact with said first medium, said first pair of electrodes consisting of dissimilar metals and reacting with said first electrolyte to produce said output; an electrolytic cell including a second absorbent matrix medium for containing a second certain electrolyte composition and a second pair of spaced electrodes arranged in contact with said second medium; and means electrically connecting said first and second pairs of electrodes for applying said output to said electrolytic cell and initiating electrolytic action therein, passage of said output through said second pair of electrodes generating reaction products in said second electrolyte at said second pair of electrodes with at least one of said reaction products migrating at a time-temperature dependent rate along said second medium to produce a visible change therein.

4. A device of the character described comprising in combination: first and second absorbent matrix members arranged adjacent each other and adapted to contain a certain electrolyte and certain indicator, said first member being relatively elongated in shape; metal connecting means intermediate said first and second matrix members contacting adjacent portions thereof; a first metal electrode contacting said first matrix member in spaced relationship with respect to said metal connecting means; a second dissimilar metal electrode contacting said second matrix member in spaced relationship with respect to said metal connecting means; and an external conductor connecting said first and second electrodes; said metal connecting means and said second electrode generating a galvanic output in conjunction with said electrolyte on said second matrix member, said galvanic output being applied to said electrolyte on said first matrix member by means of said metal connecting means and said first electrode to initiate electrolytic action therein, said electrolytic action generating reaction products in said electrolyte on said first matrix member where contacted by said metal connecting means and said first electrode with at least one of said reaction products migrating at a time-temperature dependent rate along said first matrix member, said indicator being sensitive to the presence of said reaction product and reacting therewith to indicate visually the presence thereof.

5. A device of the character described comprising in combination: first and second absorbent matrix members arranged adjacent each other; a U-shaped metal member intermediate said first and second matrix members connecting adjacent portions thereof; a first metal electrode contacting said first matrix member in spaced relationship with said U-shaped member; a second dissimilar metal electrode contacting said second matrix member; an external conductor connecting said first and second electrodes;

at least one closed rupturable vial containing a certain electrolyte situated adjacent said first and second matrix members, said vial being arranged to impregnate said matrix members with said electrolyte upon the rupture thereof, said electrolyte being capable of undergoing a galvanic action on said second matrix member upon contact with said U-shaped member and said second dissimilar metal electrode to supply an electric output to said first matrix member via said first metal electrode and said U-shaped member, said electric output initiating electrolytic action in said electrolyte impregnated in said first matrix member where contacted by said U-shaped member and said first metal electrode to generate certain reaction products thereat with at least one of said reaction products migrating at a time-temperature dependent rate along said first matrix member to produce a visible change therein; and an enclosure which houses said vial, said matrix members, said U-shaped member, said electrodes and said external conductor.

6. A device of the character described comprising in combination: means for producing an electric output the magnitude of which is dependent on temperature; an absorbent matrix medium; a pair of spaced electrodes arranged in contact with said medium; a rupturable vial disposed adjacent said medium and containing an electrolyte composition, which composition upon rupture of said vial is capable of impregnating said medium; and means electrically connecting said electric output means and said electrodes for applying said output thereto, passage of said output through said electrodes generating reaction products in said electroylte at said electrodes at a rate proportional to the temperature of said electric output means with at least one of said reaction products migrating at a time-temperature dependent rate along said medium to produce a visible change therein.

References Cited by the Examiner
UNITED STATES PATENTS

| | | | |
|---|---|---|---|
| 2,651,612 | 9/53 | Haller | 204—195 |
| 2,886,496 | 5/59 | Eckfeldt | 204—1.1 |
| 2,962,425 | 11/60 | Sharpenstein et al. | 204—195 |
| 2,962,426 | 11/60 | Sharpsteen | 204—195 |
| 3,045,179 | 7/62 | Maier | 324—68 |
| 3,046,786 | 7/62 | Tessem | 204—195 |
| 3,055,759 | 9/62 | Busby et al. | 73—356 |

OTHER REFERENCES

Lang's Handbook of Chemistry, 9th Edition, 1956, page 955.

Vinyl: "Storage Batteries," 4th Edition, 1955, pages 188 and 218.

WINSTON A. DOUGLAS, *Primary Examiner.*

JOHN R. SPECK, MURRAY TILLMAN, JOHN H. MACK, *Examiners.*